(12) United States Patent
Pavani et al.

(10) Patent No.: US 9,245,445 B2
(45) Date of Patent: Jan. 26, 2016

(54) OPTICAL TARGET DETECTION

(75) Inventors: Sri Rama Prasanna Pavani, Palo Alto, CA (US); Jonathan J. Hull, San Carlos, CA (US); Sergey Chemishkain, San Jose, CA (US); Kathrin Berkner, Los Altos, CA (US)

(73) Assignee: Ricoh Co., Ltd., Tokyo (JP)

( * ) Notice: Subject to any disclaimer, the term of this patent is extended or adjusted under 35 U.S.C. 154(b) by 581 days.

(21) Appl. No.: 13/401,738

(22) Filed: Feb. 21, 2012

(65) Prior Publication Data
US 2013/0215218 A1 Aug. 22, 2013

(51) Int. Cl.
| H04N 5/89 | (2006.01) |
| G03H 1/00 | (2006.01) |
| G08G 1/0962 | (2006.01) |
| G08G 1/16 | (2006.01) |
| G06E 3/00 | (2006.01) |
| G01V 8/10 | (2006.01) |

(52) U.S. Cl.
CPC ............ G08G 1/09623 (2013.01); G06E 3/003 (2013.01); G08G 1/166 (2013.01); G01V 8/10 (2013.01)

(58) Field of Classification Search
CPC ..................................................... G06T 7/0002
See application file for complete search history.

(56) References Cited

U.S. PATENT DOCUMENTS

| 5,544,140 | A | * | 8/1996 | Seagrave et al. | 369/59.21 |
| 6,529,614 | B1 | * | 3/2003 | Chao et al. | 382/103 |
| 6,934,060 | B2 | | 8/2005 | Psaltis | |
| 7,050,635 | B2 | * | 5/2006 | Javidi et al. | 382/210 |
| 7,068,844 | B1 | * | 6/2006 | Javidi et al. | 382/218 |
| 7,733,394 | B2 | * | 6/2010 | Hagino | 348/252 |
| 7,834,988 | B2 | | 11/2010 | Bahuguna | |
| 2006/0206243 | A1 | * | 9/2006 | Pawlicki et al. | 701/1 |
| 2007/0187512 | A1 | | 8/2007 | Yada | |
| 2008/0267504 | A1 | | 10/2008 | Schloter et al. | |
| 2010/0020970 | A1 | * | 1/2010 | Liu et al. | 380/255 |
| 2010/0155464 | A1 | * | 6/2010 | Swayn et al. | 235/375 |
| 2012/0287031 | A1 | * | 11/2012 | Valko et al. | 345/156 |

* cited by examiner

Primary Examiner — Gims Philippe
Assistant Examiner — Kyle Lotfi
(74) Attorney, Agent, or Firm — Fenwick & West LLP

(57) ABSTRACT

An optically-based target detection system includes a holographic detection filter designed to produce a concentrated spot when a target is present.

20 Claims, 4 Drawing Sheets

OPTICAL TARGET DETECTION

BACKGROUND OF THE INVENTION

1. Field of the Invention

This invention relates generally to optically-based target detection.

2. Description of the Related Art

Target detection is the task of determining the presence or absence of a known object, referred to as the target. An action may then be taken based on the presence/absence of the target. This is useful in a variety of applications, including factory automation, automobiles, and consumer electronics. For example, a smart automobile could use pedestrian detection to avoid accidents. In another application, a smart quality-check system may reject defective products in an assembly line to improve production quality.

The conventional approach for performing target detection involves acquiring images with a camera and then processing the acquired images to determine if the target is present. Unfortunately, camera sensor arrays and software/hardware based image processing solutions have significant power requirements, which render them unsuitable for target detection and monitoring in low-power applications. Furthermore, in high-speed applications such as semiconductor wafer inspection, the speed of camera based target detectors is constrained by the need to acquire, transmit and process large amounts of image data.

As a specific example, quick recognition (QR) codes are popular two-dimensional barcodes used to encode text, URLs, vCards, and other forms of data. Although originally developed for tracking parts in factories, QR codes have found renewed interest in mobile tagging after the rapid emergence of smart camera phones and cameras on other types of mobile compute devices. Notably, the use of QR codes allows high speed reading of their encoded content with reduced read-out errors. However, QR codes are traditionally detected by acquiring their images using a conventional imaging system, a sensor array with a large number of pixels, and image-processing algorithms. If a mobile compute device is tasked with continuously monitoring whether a QR code is present in its field of view, then it must be constantly acquiring images and processing them to detect the presence of QR codes. This is a significant power drain.

Thus, there is a need for improved approaches to target detection.

SUMMARY OF THE INVENTION

The present invention overcomes the limitations of the prior art by providing an optically-based target detection system. The system includes a holographic detection filter designed to produce a concentrated spot when a target is present.

In one embodiment, the optical target detection system includes an optical subsystem and a light-distribution-sensitive detector. The optical subsystem, which includes the holographic detection filter, produces a more concentrated optical signal at the detector if the target is present and a more dispersed optical signal if the target is not present. The detector is "light-distribution-sensitive" in that the electrical output from the detector depends on the distribution of light incident on the detector, in addition to the total optical power. In one design, the detector produces a lower electrical output when the optical distribution is more concentrated and produces a higher electrical output (for the same overall optical power) when the optical distribution is less concentrated. Thus, whether the target is present can be determined based on the electrical output of the detector. Additional functions, such as an ambient light detector, can be used to normalize the output of the detector.

Different types of holographic detection filters can be used. Matched filters (and other types of correlation filters) and inverse filters are two varieties. Design considerations may dictate additional constraints on the holographic detection filter. For example, the holographic detection filter may be constrained to be phase-only (no or little amplitude variation) in order to increase light throughput, or binary in order to simplify manufacturing. Spatial light modulators can be used to implement programmable holographic detection filters. The holographic detection filters can also be designed for use with coherent light or with incoherent illumination.

Other aspects of the invention include applications for these devices, and methods corresponding to these devices, systems and applications.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
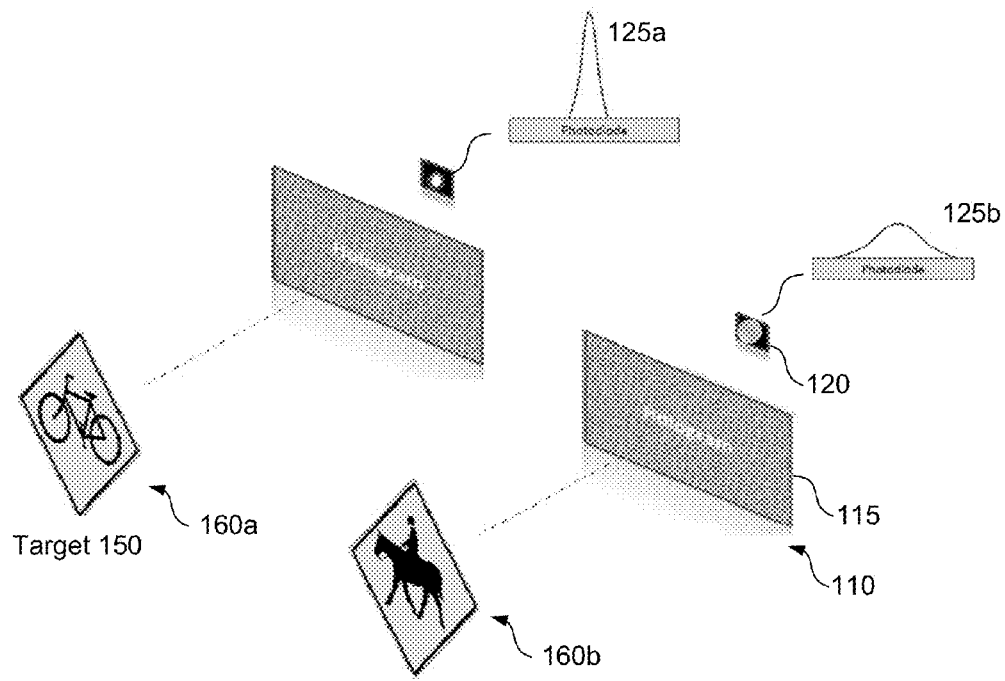
FIG. 1 is a diagram illustrating optical target detection according to the present invention.

FIG. 1 is a diagram illustrating optical target detection according to the present invention. In this example, the target to be detected is a bike. The optical target detection system is designed to detect whether the target 150 is present in a scene 160. FIG. 1 shows two scenes. In scene 160a, the target bike is present. In scene 160b, the target bike is not present.

The optical target detection system includes an optical subsystem 110 and a detector 120. The optical subsystem 110 includes a holographic detection filter 115. For clarity, the rest of the optical subsystem 110, if any, is not shown in FIG. 1. The optical subsystem 110 receives light from the scene 160 and produces a distribution of light at a detection plane, which is where the detector 120 is located. For convenience, the light at the detection plane will be referred to as an optical detection signal. The holographic detection filter 115 is designed to produce a concentrated spot at the detection plane if the target is present and more of a blur when the target is not present. In FIG. 1, these are represented by light distributions 125a and 125b, respectively. For clarity, curves 125a and 125b show just the contribution from the target bike or the non-target horse and rider. There may be other contributions from other elements in the scene.

In this example, the detector 120 is a light-distribution-sensitive detector, meaning that the output from the detector depends on both the total amount of light incident on the detector but also on the distribution of that light. In one implementation, the detector has a single pixel that produces a single electrical output. The detector produces a lower electrical output when the optical detection signal 125 is more concentrated (due to lower conversion efficiency from photons to electrons) and produces a higher electrical output when the signal 125 is less concentrated. Therefore, a lower electrical output indicates presence of the target.

Examples of such detectors include photodiodes, solar photovoltaic cells, CCD detectors, CMOS detectors, photomultiplier tubes, and nantennas (nano antennas). For example, photodiodes operate by knocking out electrons in their PN junction region in response to impingement of photons. The number of electrons generated is a function of the number of photons and the quantum efficiency of the detector. Interestingly, the number of electrons generated is also a function of the intensity distribution of the optical radiation. In other words, equal number of photons falling on a detector may knock out different number of electrons depending on the intensity distribution of the photons. The fundamental reason for this behavior is because uniform optical distributions exhibit stronger interactions in the photodiode junction region than non-uniform distributions. By uniformly spreading out photons, uniform optical distributions make better use of the surface area of the photodiode to yield higher electrical outputs.

In FIG. 1, assume that the two optical distributions 125a-b have equal optical powers. However, they result in unequal electrical powers. The electrical output produced by optical distribution 125a is lower than that produced by optical distribution 125b because distribution 125b results in a more efficient usage of photodiode charge carriers. The distribution 125b makes better use of the surface area of the photodiode. Consequently, the electric voltage produced by optical detection signal 125a will be lower than that for signal 125b.

Figure 2A:
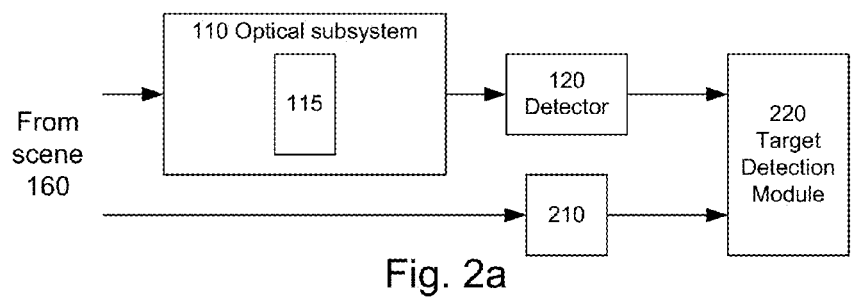
FIGS. 2a-b are block diagrams illustrating embodiments of an optical target detection system according to the present invention.

As shown in FIG. 2a, an ambient light detector 210 can be used to normalize the outputs relative to the overall brightness of the scene. In FIG. 2a, the optical target detection system additionally includes an ambient light detector 210 and a target detection module 220. The ambient light detector receives light from the scene and produces an output that is a measure of the overall brightness of the scene. The target detection module 220 uses this signal to normalize the signal received from the light-distribution-sensitive detector 120. For example, assume that both scenes 160 in FIG. 1 have the same brightness so that the ambient light detector 210 produces an output of 10V for both scene 160a and scene 160b. However, the detector 120 produces an output of 9.5V for scene 160a due to the concentrated spot and 10V for scene 160b due to the dispersed optical detection signal. The 10V output from the ambient light detector 210 indicates that the 9.5V output from the detector 120 is from a 10V scene with a concentrated optical detection signal (i.e., target present) rather than from a 9.5V scene with a dispersed optical detection signal.

Figure 2B:
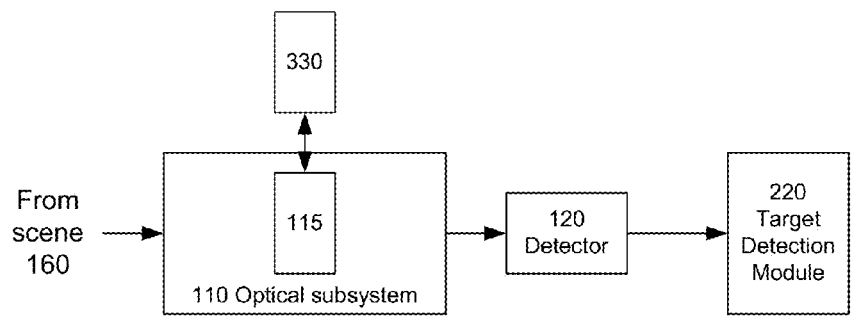

This normalization can be performed in other ways. In FIG. 2b, the detection module 220 receives one signal, but it is temporally multiplexed. The holographic detection filter 130 is periodically changed to an optical element 330 that produces a diffuse distribution at the detector 120, for example a diffuser or a homogeneous (mirror/glass-plate) optical element. For example, if the filter 130 is programmable, it can be reprogrammed to temporarily act as element 330 rather than the holographic detection filter. When element 330 is in place, the output signal is a measure of the ambient light. When the holographic detection filter is in place, the output signal indicates whether the target is present.

Figure 3:
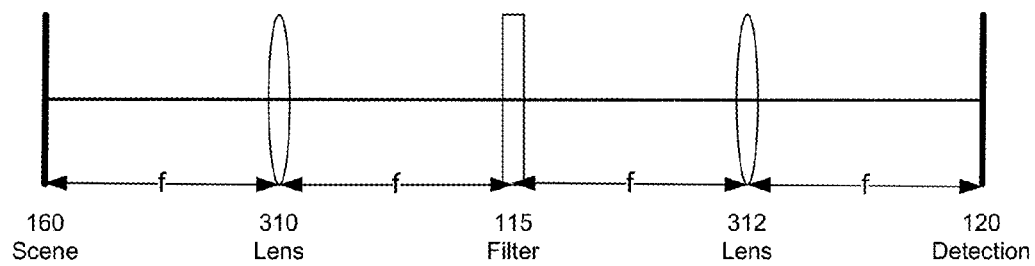
FIG. 3 is a diagram of an optical subsystem suitable for use with the present invention.

FIG. 3 is a diagram of an optical subsystem suitable for use with the present invention. This example is a 4-f system. The two lenses 310, 312 both have focal length f. The scene 160 is located at a distance f before the first lens 310. The holographic detection filter 115 is located at a distance f behind the first lens 310 and a distance f before the second lens 312. The detection plane and detector 120 are located at a distance f behind the second lens 312. Without the filter 115, this optical subsystem would produce an image of the scene 160 at the detection plane. That is, the two lenses 310, 312 form an imaging system, and the detection plane is located at the image plane (or one of its conjugates). Due to the 4-f spacing, a Fourier transform of the scene is formed at the location of the holographic detection filter 115. That is, the holographic detection filter 115 is located at a Fourier plane of the system (or one of its conjugates). The holographic detection filter is then a filter applied in the spatial frequency domain.

The system shown in FIG. 3 is just an example. Other variants will be apparent. In one implementation, a single optical element performs the functions of the holographic detection filter 115 and also those of the lenses 310 and 312, thus achieving a compact system with a single optical element.

If the target is present in the scene, the holographic detection filter will produce a concentrated spot at the detection plane. In this setup, the holographic detection filter is space-invariant. Moving the target to different locations in the scene will still produce a concentrated spot at the detection plane, just at different locations at the detection plane. If the detector 120 is large enough so that the spot still falls on the detector, then the optical target detection system can detect the target anywhere within the field of view defined by the detector.

The system shown in FIG. 3 is just one example. Other implementations will be apparent. Further aspects will be illustrated using an example where the task is to determine whether a QR code is present in the field of view of a cell phone camera. Once a QR code is detected, the cell phone may take appropriate actions.

Figure 4:
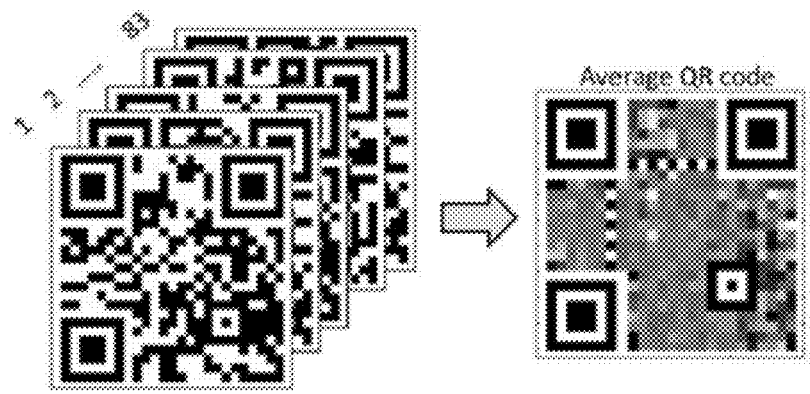
FIG. 4 illustrates a target based on averaging a number of QR codes.

QR codes have alignment markers whose shapes and relative positions do not change regardless of the data encoded in them. These alignment markers can therefore be used as feature vectors for detecting QR codes. An optical hologram encoding these feature vectors can be designed to produce a distinct response whenever a QR code is placed in front of it. In a simulation, 83 QR codes encoding music URLs were averaged to identify their common features, as shown in FIG. 4. This "average" QR code is used as the target for designing the holographic detection filter. Note that the target is a combination of the 83 underlying "component" targets.

Most optical subsystems are linear systems exhibiting linearity either in electric field (E) or in intensity (I), depending on whether the illumination is spatially coherent (e.g. laser light) or incoherent (e.g. room light). The transfer function of an optical subsystem can be engineered by inserting a filter in its Fourier plane, as shown in FIG. 3. During an imaging operation, the Fourier plane physically hosts the Fourier transform of the scene under investigation. By modulating the amplitude and phase of light in the Fourier plane, filters have the ability to engineer the point spread function (PSF; impulse response) of the optical subsystem.

Since coherent optical systems are linear in electric field, the holographic detection filter inserted in the Fourier plane directly represents the transfer function of the system. However, the intensity linearity of incoherent systems makes the autocorrelation of the optical mask as the system's transfer function. This constrains incoherent systems to have (phase-less) positive PSFs. In other words, while coherent systems can be designed to have an arbitrary PSF ($h_c$) involving arbitrary amplitude and phase profiles, incoherent systems are constrained to have PSFs of the form $h_i = |h_c|^2$.

The holographic detection filters designed for both coherent and incoherent cases preferably have both amplitude and phase components to them. These holographic detection filters can be implemented by placing an amplitude mask (e.g. transparency print out) close to a phase mask (e.g. glass mask with spatially varying thickness). They can also be implemented by a computer generated hologram that modulates both amplitude and phase. Depending on the implementation, the holographic detection filter might be constrained in its design. For example, amplitude filters reduce overall light throughput, so phase-only filters have an advantage of higher light throughput. Binary filters are simpler still to implement. Holographic detection filters can also be implemented via spatial light modulators. If the spatial light modulator can be changed, then the holographic detection filter will be programmable.

Iterative optimization techniques may be used to design holographic detection filters that simultaneously satisfy different constraints in different domains. For example, an incoherent holographic detection filter might be required to be 1) light efficient (less absorbing elements in Fourier plane), 2) phase-only (fabrication convenience), 3) exhibiting a positive (phase-less) PSF, and/or 4) produce a desired optical response at the detection plane.

Figure 5:
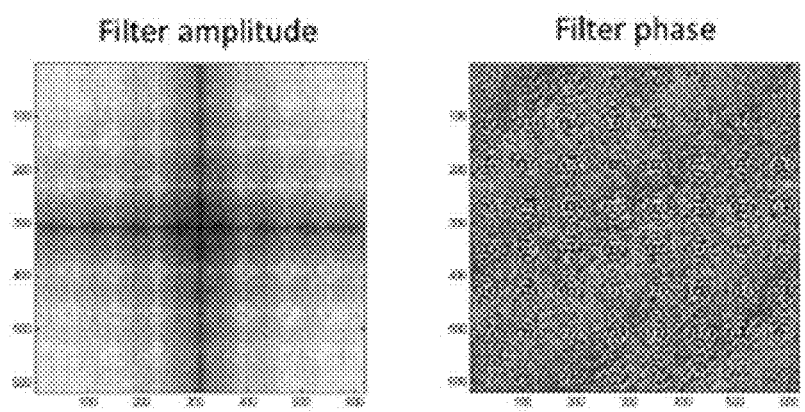
FIG. 5 shows the amplitude and phase of an inverse filter designed for the composite QR target of FIG. 4.

Two approaches that can be used to design filters for QR code detection include the inverse filter and the matched filter. In the inverse filter approach, the filter is designed such that the transfer function of the optical system is the inverse of the regularized Fourier transform of the target. In practice, this is achievable with coherent illumination. One type of inverse filter is given by:

$$\text{Inverse filter}(u,v) = H\{L(u,v)/O(u,v)\} \quad (1)$$

where (u,v) are spatial frequency coordinates which correspond to spatial coordinates in the Fourier plane, O(u,v) is the Fourier transform of the target and L(u,v) is a lens transfer function. In this example, the inverse filter functions both as a lens (due to the lens function L) and as a holographic detection filter (due to the 1/O term). FIG. 5 shows the amplitude and phase of an inverse filter designed for the composite QR target of FIG. 4. When a coherently-illuminated QR code is placed in front of the inverse filter, the Fourier transform of the QR code is multiplied by the inverse filter to produce a plane wave, which is focused to a point by the lens L. H{ } is a hologram function (optional) that converts the amplitude and phase components of the filter into an amplitude-only or a phase-only hologram, if so desired.

In the matched filter approach, the transfer function of the optical system is designed to be the conjugate (O*) of the Fourier transform of the target, where the * indicates the complex conjugate. One advantage of this approach is that it can be implemented in both coherent and incoherent cases. In the coherent case, the optical mask directly encodes the matched filter function, for example:

$$\text{Matched filter}(u,v) = H\{O^*(u,v)L(u,v)\} \quad (2)$$

Figure 6:
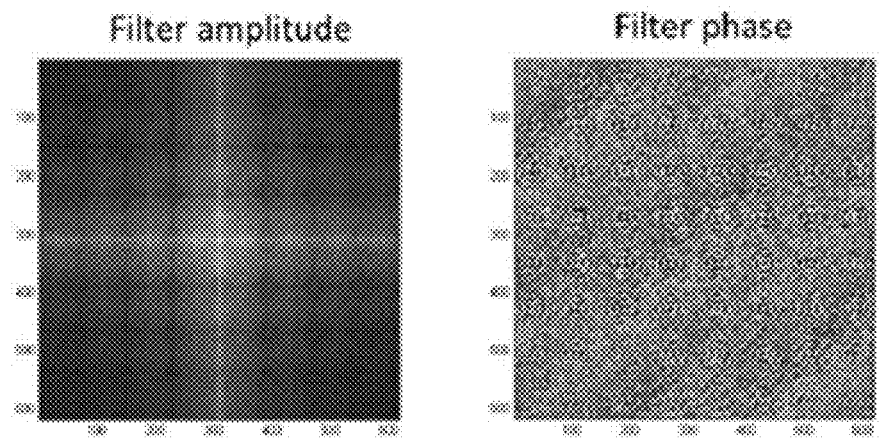
FIG. 6 shows the amplitude and phase of a matched filter designed for the composite QR target of FIG. 4.

FIG. 6 shows the amplitude and phase of a matched filter designed for the composite QR target of FIG. 4, assuming incoherent illumination.

In the incoherent case, the filter is designed such that its autocorrelation represents the matched filter function. In other words, we are interested in finding the mask function M, such that M**M=O* where the ** operator is the correlation function. This problem has multiple valid solutions, one of which is M=F{sqrt[$F^{-1}$ {O*}]}, where F{ } is the 2D Fourier transform operator.

Figure 7:
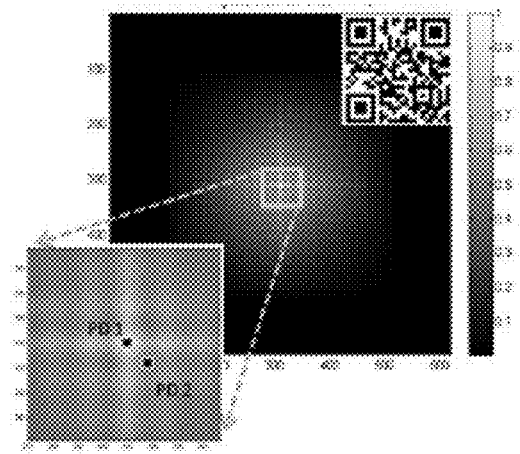
FIG. 7 shows the matched filter response in the presence of a target.

The matched filter approach is more suitable than the inverse filter for use with incoherent illumination. However, in contrast to the inverse filter case, the matched filter typically does not produce a single spot when the target is detected. Instead, it produces a distinctly recognizable response. FIG. 7 shows the matched filter response in the presence of a target. The response has its peak intensity at the center surrounded by a number of valleys. Interestingly, the matched filter does not produce this distinct pattern when it sees other objects. Thus, target detection could be based on features of this structure.

In one approach, two single pixel detectors are placed at the peak location PD1 and the valley location(s) PD2 of the matched filter's response. In a simple implementation, the ratio of the detected intensities ($c = I_{pd2}/I_{pd1}$) can be used as a classification metric for detecting the presence of the QR codes. Specifically, the value of c is close to 0 when a QR code is present, and close to 1 when there is no QR code. Alternatively, a Fisher linear discriminant analysis may be employed to project the two dimensional data from the two single pixel detectors on to a one dimensional line to perform classification. In such an analysis, the angle of projection is determined by maximizing the means of the two classes while minimizing their standard deviations. The hologram design for this detection approach preferably boosts the intensity value at the peak location and suppresses the intensity value at the valley location of the target response.

Another implementation uses a single detector combined with temporal processing of intensity levels. In this scenario, the user moves the optical target detection system relative to the scene. The relative motion causes the filter response to correspondingly move with respect to the photodiode. Classification is performed as the ratio of the lowest and highest recorded intensity levels within a given time interval. For a non-target object, the intensity levels will be approximately constant as a function of time. Consequently, the classification metric will be close to 1. However, if a target QR code is present, the motion will result in different intensity levels falling on the photodiode at different times, resulting in a c value closer to 0. The hologram design for this detection approach also preferably boosts the intensity value at the peak location and suppresses the intensity value at the valley location of the target response.

In the discussion above, the function H{ } is a function that converts an ideal design to a design that meets other constraints. For example, the matched filter design shown in FIG. 6 has significant amplitude variation, which results in reduced light efficiency and a more difficult implementation. It may be desirable to design a holographic detection filter that is phase-only or close to phase-only.

Figure 8:
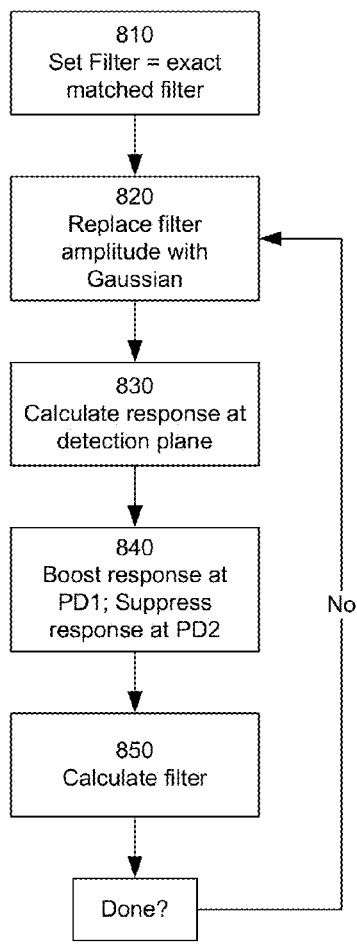
FIG. 8 is a flow diagram of a method for designing a near-phase-only holographic detection filter.

FIG. 8 is a flow diagram of an iterative method for designing a near-phase-only holographic detection filter. Begin 810 with the exact matched filter as the initial estimate of the filter. The matched filter has an amplitude and phase component. Replace 820 the amplitude component with a Gaussian amplitude distribution, while retaining the phase component. If a phase-only filter is desired, then the amplitude component can be replaced 820 by a uniform amplitude distribution instead. Calculate 830 the detection-plane response for the modified filter. In one detection method, boost 840 the response at location PD1 (the peak location for the ideal matched filter) and suppress 840 the response at location(s) PD2 (the valley locations for the ideal matched filter). In an alternate approach, boost 840 the peak (spot-like) response for the target to reduce the spot size if the target response. Calculate 850 the filter that corresponds to the modified detection-plane response. Iterate steps 820-850. In one approach, the iteration optimizes for both optimal target response (depending on the choice of detection method) and minimal light loss (phase-only) in filter implementation. Detector properties such as sensitivity, linearity, and homogeneity can be used for setting the criterion for stopping the iterative optimization process.

Robust filters can be designed to account for changes in target shape in the detection environment. Individual matched filters for variants of a target can be applied as constraints in the filter design algorithm.

Figure 9:
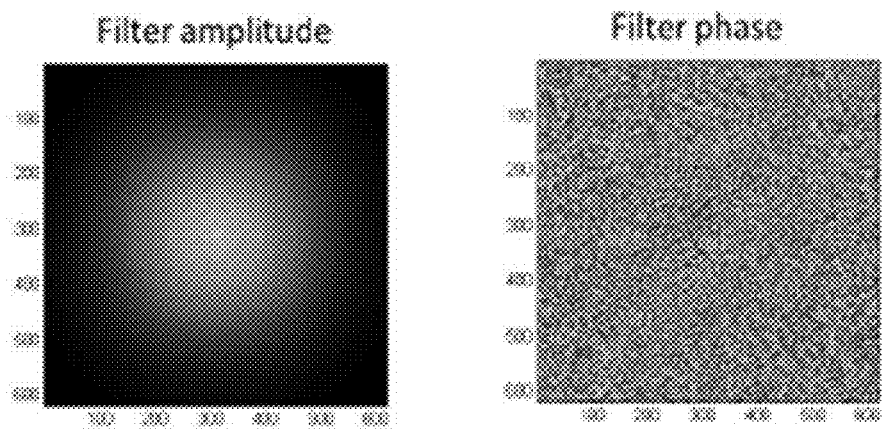
FIG. 9 shows the amplitude and phase of a modified matched filter designed for the composite QR target of FIG. 4.
Figure 10:
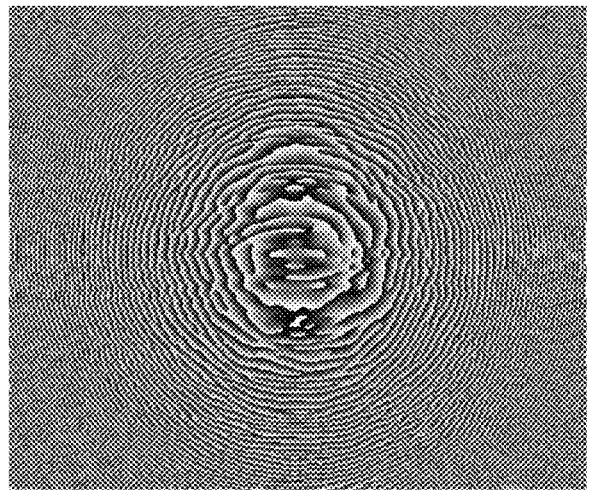
FIG. 10 shows the phase of a phase-only holographic detection filter.
Figure 11:
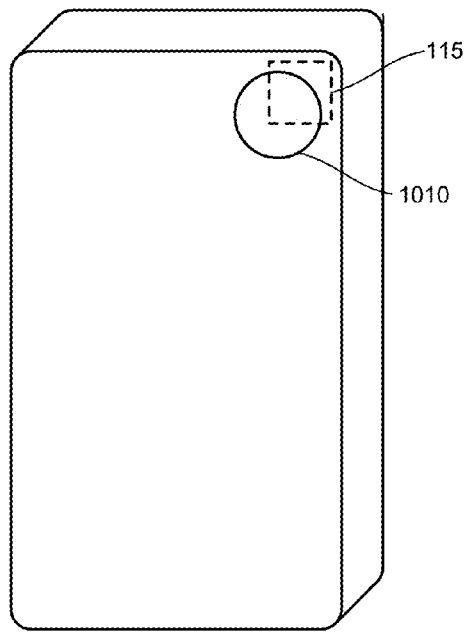
FIG. 11 is a diagram of a cell phone with a built-in optical target detection system.

This design approach was applied to the matched filter of FIG. 6. FIG. 9 shows the amplitude and phase of the resulting near-phase-only holographic detection filter. Note that the filter response shown is the autocorrelation of the holographic detection filter that is be physically implemented. The filter efficiency is improved by 22×, while maintaining the discrimination ability of the original. The improved light efficiency increases detection SNR and consequently reduces the error in estimating c. The filter used for generating FIG. 9 is a continuous phase mask which can be fabricated, for example, with diamond turning or gray-scale projection lithography. Quantized phase level masks can designed by imposing a quantization constraint in step 820 (Fourier domain constraint) of the optimization procedure explained above. FIG. 10 shows the phase of a constant amplitude (phase-only) holographic detection filter.

The optical target detection system described above can be used in various applications. One class of applications is where both the target and the scenes are well-controlled. That is, the target is known and not very variable. The scene also does not vary much. Examples include identifying objects in a manufacturing environment, such as counting objects that pass through a field of view with a controlled background. Manufacturing line inspection and defect detection are two examples. The system can also be used in semiconductor mask and wafer inspection for high-speed quality control. In addition, the system may find application in automotive applications such as traffic sign detection and pedestrian detection.

FIG. 10 shows an application where the optical target detection system is part of a mobile compute device, for example a cell phone or tablet. The circle 1010 represents a lens which is part of the optical subsystem. The dashed square 115 is the holographic detection filter, which is located in the interior of the device. In this particular example, the holographic detection filter 115 is designed to detect the presence of a QR code. The QR code detection process may be activated by the user, or it may be a constant monitoring function, or some combination of the two. When a QR code is detected, the compute device then takes appropriate action.

In one design, the optical target detection system uses some of the features described above. The holographic detection filter 115 is designed to detect QR codes, assuming incoherent illumination from the ambient surroundings. The optical detection signal incident on the detector is more concentrated when a QR code is present, and less concentrated when a QR code is not present. The detector within the optical target detection system is a single sensor that covers a desired field of view. For example, the system may be designed to cover 180 deg×180 deg, 120 deg×120 deg, 60 deg×60 deg, 30 deg×30 deg, or 5 deg×5 deg fields of view. Detector sizes can include 5 cm×5 cm, 1 cm×1 cm, 0.5 cm×0.5 cm, 0.1 cm×0.1 cm, 0.5 mm×0.5 mm, 0.1 mm×0.1 mm, 10 µm×10 µm and 1.5 µm×1.5 µm. The sensor outputs a single electrical output (e.g., a voltage signal). The electrical output is lower if a QR code is present (due to the more concentrated optical detection signal) and higher if a QR code is not present, assuming equal overall illuminations of the two scenarios. That is, the sensor is light-distribution-sensitive. The optical target detection system may also include an ambient light detector to measure the average illumination of the scene. A target detection module receives the outputs of the light-distribution-sensitive detector and the ambient light detector. Based on these, it determines whether a QR code is present.

For mobile devices, it is desirable to reduce the size, weight and power consumption of the optical target detection system. The optics preferably is designed to have a reduced size. For example, the holographic detection filter and imaging lens may be combined into a single element. As another example, if the mobile device has other optics, for example a camera lens, those optics may be shared with the optical target detection system. With respect to power consumption, the optical subsystem preferably is passive so that it does not consume power. If the application is continuously monitoring the environment, then the light-distribution-sensitive detector and associated electronics preferably are designed so that they do not require continuous power. For example, the detector may be run from the power in the received optical detection signal. It could be a low power photo-diode or a solar photovoltaic cell that does not need power for operation.

Although the detailed description contains many specifics, these should not be construed as limiting the scope of the invention but merely as illustrating different examples and aspects of the invention. It should be appreciated that the scope of the invention includes other embodiments not discussed in detail above. For example, multiplexed holograms can be designed or multiple individual holograms, each designed for a different target, can be used to simultaneously detect multiple targets. Target holograms can be designed to have spectral properties for improving target detection accuracy. Adaptive elements such as spatial light modulators and digital micromirror devices can be used to implement target holograms in real time. Another variant would be to replace the photovoltaic detector with a very low-power image sensor, like the one used for optical mice. The electrical signals from the detectors can be used for classification either in hardware or in software. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, components of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Various combinations can also be used. Certain functions may be common enough as to be available as standard components, software, or circuit designs. These may be combined with customized implementations of the remaining functions. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. An optical target detection system for detecting a presence of a target in a scene, the system comprising:
    an optical subsystem including a holographic detection filter, the optical subsystem receiving light from the scene and producing an optical detection signal at a detection plane of the optical subsystem, the holographic detection filter resulting in a more concentrated optical detection signal when the target is present and a more dispersed optical detection signal when the target is not present; and
    a light-distribution-sensitive detector located at the detection plane to receive the optical detection signal, the detector made of only a single pixel that produces a single electrical output, the detector producing a lower electrical output when the optical detection signal having a certain optical power incident on the pixel is more concentrated in its distribution across the pixel, and producing a higher electrical output when the optical detection signal having the same optical power incident on the pixel is less concentrated in its distribution across the pixel, wherein presence of the target is determined based on the electrical output.

2. The optical target detection system of claim 1 wherein the holographic detection filter is a correlation filter for the target.

3. The optical target detection system of claim 1 wherein the holographic detection filter is an inverse filter of the target.

4. The optical target detection system of claim 1 wherein the holographic detection filter is a programmable filter.

5. The optical target detection system of claim 1 wherein the holographic detection filter is a phase-only filter.

6. The optical target detection system of claim 1 wherein the holographic detection filter is a binary filter.

7. The optical target detection system of claim 1 wherein the optical subsystem includes imaging optics.

8. The optical target detection system of claim 1 wherein the detection plane is located at an image plane conjugate for the imaging optics, and the holographic detection filter is located at a Fourier plane conjugate.

9. The optical target detection system of claim 1 wherein optical subsystem receives incoherent light from the scene.

10. The optical target detection system of claim 1 wherein the target is based on a combination of component targets.

11. The optical target detection system of claim 1 wherein the target is based on QR codes.

12. The optical target detection system of claim 1 wherein the optical subsystem is passive and the light-distribution-sensitive detector does not require continuous power for continuous operation of the optical target detection system.

13. The optical target detection system of claim 1 further comprising:
    an ambient light detector for receiving light from the scene and producing an output signal indicative of the average illumination of the scene; and
    a target detection module coupled to the light-distribution-sensitive detector and to the ambient light detector, for determining presence of the target based on the electrical output of the light-distribution-sensitive detector and the output signal from the ambient light detector.

14. The optical target detection system of claim 1 wherein the light-distribution sensitive detector is a photodiode.

15. The optical target detection system of claim 1 wherein the holographic detection filter is space invariant.

16. The optical target detection system of claim 15 wherein the optical target detection system has a field of view of at least 30 deg×30 deg.

17. The optical target detection system of claim 1 wherein the optical target detection system is implemented within a mobile computer device.

18. The optical target detection system of claim 17 wherein the optical subsystem includes an optical element that functions as a combination of a lens and the holographic detection filter.

19. A method for detecting a presence of a target in a scene, the method comprising:
- receiving light from the scene, the light propagating through an optical subsystem including a holographic detection filter;
- producing an optical detection signal at a detection plane of the optical subsystem, the holographic detection filter resulting in a more concentrated optical detection signal when the target is present and a more dispersed optical detection signal when the target is not present;
- receiving the optical detection signal at a light-distribution-sensitive detector, the detector made of only a single pixel that produces a single electrical output, the detector producing a lower electrical output when the optical detection signal having a certain optical power incident on the pixel is more concentrated in its distribution across the pixel and producing a higher electrical output when the optical detection signal having the same optical power incident on the pixel is less concentrated in its distribution across the pixel; and determining a presence of the target in the scene based on the electrical output.

20. A mobile computer device that includes an optical target detection system, the optical target detection system comprising:
- an optical subsystem including a holographic detection filter, the optical subsystem receiving incoherent light from the scene and producing an optical detection signal at a detection plane of the optical subsystem, the holographic detection filter resulting in a more concentrated optical detection signal when the target is present and a more dispersed optical detection signal when the target is not present;
- a light-distribution-sensitive detector located at the detection plane to receive the optical detection signal, the detector made of only a single pixel that produces a single electrical output, the detector producing a lower electrical output when the optical detection signal having a certain optical power incident on the pixel is more concentrated in its distribution across the pixel and producing a higher electrical output when the optical detection signal having the same optical power incident on the pixel is less concentrated in its distribution across the pixel;
- an ambient light detector for receiving light from the scene and producing an output signal indicative of the average illumination of the scene; and
- a target detection module coupled to the light-distribution-sensitive detector and to the ambient light detector, for determining presence of the target based on the electrical output of the light-distribution-sensitive detector and the output signal from the ambient light detector, wherein the light-distribution-sensitive detector is large enough to detect presence of the target over a field of view of at least 30 deg×30 deg.

* * * * *